June 17, 1947.  J. A. CAMPBELL  2,422,527
GAS SEPARATOR
Filed Oct. 7, 1944
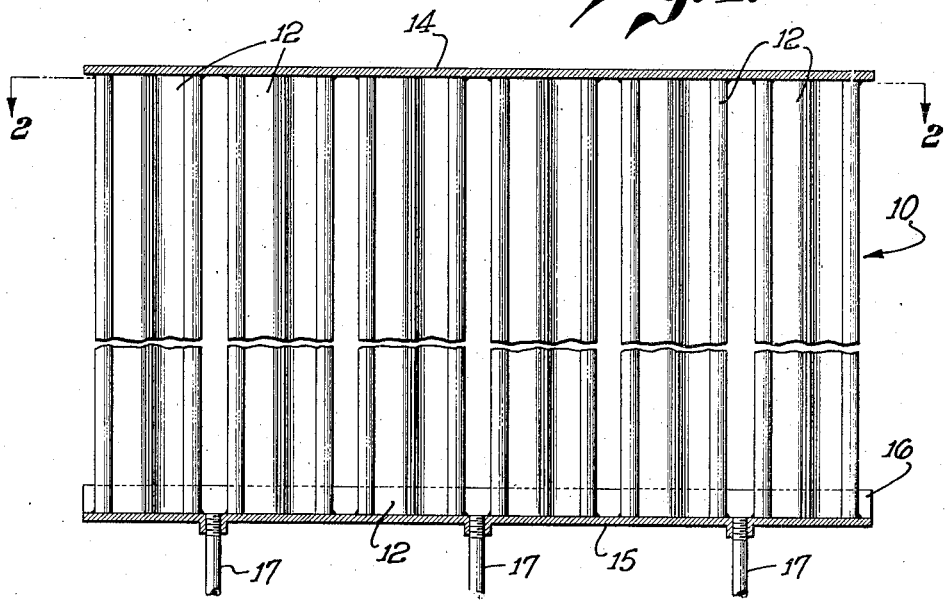
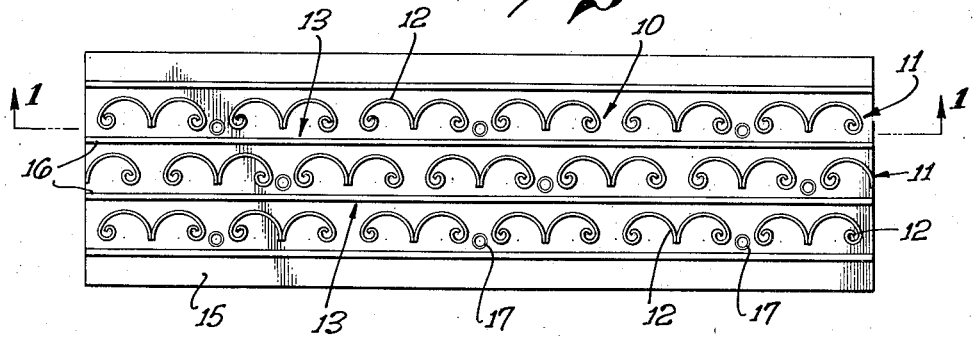
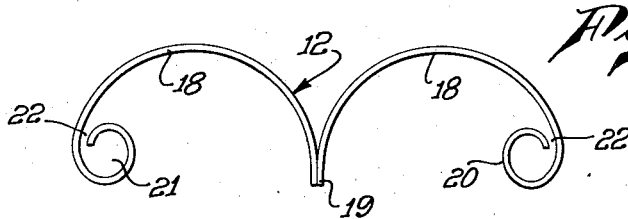
INVENTOR.
JULIAN A. CAMPBELL,
BY
ATTORNEY.

Patented June 17, 1947

2,422,527

UNITED STATES PATENT OFFICE 2,422,527

GAS SEPARATOR

Julian A. Campbell, Long Beach, Calif.

Application October 7, 1944, Serial No. 557,621

3 Claims. (Cl. 183—77)

This invention has to do with improvements in separators for removing liquid entrainment from gas, and particularly of the type in which the separator element or unit comprises spaced rows of individually spaced and relatively offset baffles, positioned vertically in the path of the gas stream so that the gas impinges against and flows between the baffles of the successive rows.

The invention is concerned primarily with improvements in the shape and form of the individual baffles, and has for its primary object to effect substantially complete removal of all liquid entrainment from the gas by a combination of effects, namely, by greater liquid deposition upon the gas-impinged surfaces of the baffle, and complete isolation and removal of the liquid so deposited, in a manner effectively preventing its re-entrainment by the gas.

In accordance with the invention, the first of these effects is created and its purpose served, by giving the individual baffle a concave shape curving in the direction of the gas flow so that the gas impinging against the concave surface is turned and caused to traverse the baffle in a curved path of flow causing the entrained liquid particles to separate out and collect on the baffle surface by virtue of their inertia and tendency to continue in the path of approach to the baffle, and also by the tendency of the particles to separate centrifugally from the gas stream flowing across the concave face of the baffle. Preferably, the body of the baffle has two such concave portions at opposite sides of its transverse center, so that the gas stream striking the baffle is split and the separated streams are subjected to the stated entrainment precipitating effects.

Of importance equal to securing maximum deposition of entrainment on the baffle surfaces, is the entrapment and isolation of the liquid so that it cannot again be swept into the gas stream. Entrapment of the separated liquid is accomplished by forming the baffle with inwardly turned edges spaced from the body of the baffle to form narrow openings or slots through which the separated liquid is displaced into quiescent zones contained within the turned outer portions of the baffle and effectively isolated from any high velocity part of the gas stream. Within such zones, the liquid drains to the bottoms of the baffles and is suitably withdrawn, as in the manner later explained.

The invention has other more specific features and objects, such as the particular and most efficient baffle shape characteristics, but all of these will be explained to best advantage by reference to the accompanying drawing illustrative of the invention in its preferred form, and in which:

Fig. 1 is a vertical sectional view of the baffle assembly taken on line 1—1 of Fig. 2;

Fig. 2 is a cross-section on line 2—2 of Fig. 1; and

Fig. 3 is an enlarged cross-sectional view of an individual baffle.

For purposes of description and illustration, I have shown a baffle assembly or nest, generally indicated at 10, adapted to be installed within a separator shell or chamber of any suitable type, and in a manner well understood by those familiar with the art. The assembly 10 comprises spaced rows 11 of vertically extending baffles 12, the baffles in the individual rows being spaced at 13 and the baffles in successive rows being relatively and symmetrically offset, all as illustrated. The baffles 12 extend between upper and lower horizontally extending plates 14 and 15 to which the baffles may be terminally secured in any suitable manner, as by welding. Upstanding flanges or dams 16 extending between the baffle rows 11, prevent the gas flowing through the assembly from sweeping at high velocity in contact with, and thereby re-entraining, the liquid draining from the baffles onto plate 15. Separated liquid on the lower plate between the dams, drains through pipes 17 into the usual collecting chamber.

Referring to Fig. 3, each baffle 12 comprises an intermediate or body section having concave portions 18 curving in the direction of the gas flow against the baffle, at opposite sides of the central dividing edge 19 of the baffle. Lateral deflection of the gas stream upon striking the baffle produces an initial separating effect due to the tendency of the liquid particles, because of their inertia, to continue in their path of approach to the baffle, and thereby become deposited on its surface. A further separating effect however occurs in that the gas, in traversing the concave surfaces 18 of the baffle, is caused to take a reversely curving path of flow at a velocity such that remaining liquid particles are centrifugally projected out of the gas onto the baffle surface. As will be understood, the spaces at 13 between the baffles may be made sufficiently narrow to obtain adequately high impingement velocity of the gas against the baffle.

The tendency of the gas flow across the baffle surfaces is to displace or cause the separated liquid to "creep" toward the outer edges of the baffle. This liquid is effectively trapped and isolated from exposure to the gas stream by turning the edge portions of the baffle inwardly, and preferably circularly at 20 to form vertically continuous zones 21 which the liquid enters through a narrow space or slot at 22. By virtue of the continuous curvature of portions 18 and 20, the liquid enters the zone 21 smoothly, and without resistance, as fast as it accumulates on the baffle surface. Upon entering the zone 21, the separated liquid drains to the bottom and onto plate 15. It is desirable that the upper end of zones 21 be effectively closed, and for this purpose, the turned portions 20 are shown to be welded to the upper plate 14.

For most efficient results, the concave portions 18 of the baffle are given substantially semi-circular shape on a relatively long radius. The turned edge portions 20 preferably are given substantially full circular curvature but on a relatively small radius. Merely as illustrative, the concave portions 18 may be formed on radii of about one inch and the circular or cylindrical portions 20 on one-fourth inch radii, with the spaces at 22 restricted to about one-sixteenth inch. It will be observed that the central and edge portions of the baffle lie in substantially the same plane normal to the path of the approaching gas, and therefore that the gas is given such change in direction of flow as to effectively create the described centrifugal separating action on the entrained liquid particles.

While in the drawing the baffles are shown to be mounted in true vertical positions, it will be understood that if desired, the baffles may be given a substantial degree of inclination downwardly in the direction of gas flow. Reference in the claims to the baffle or baffles being "vertically positioned" is to be construed accordingly.

I claim:

1. A separator comprising a vertically extending baffle having a gas-impinged surface curved concavely in the direction of the gas flow, said baffle having an inwardly turned outer edge portion curved throughout substantially 360 degrees and extending in the direction of said concave surface and in spaced relation thereto to form a narrow convergent throat through which liquid entrainment particles centrifugally deposited on said concave surface by the gas sweep toward said edge portion are displaced into a vertically extending zone isolated within said turned portion from the gas stream, the minimum spacing of said turned portion and concave surface within said throat being restricted to a gap capable of passing deposited liquid entrainment into said zone but sufficiently narrow to prevent gas flow into and out of said zone through the throat at any appreciable velocity.

2. A separator comprising a vertically positioned baffle having a pair of gas-impinged surfaces curved concavely and substantially semi-circularly in the direction of the gas flow at opposite sides of and starting at a forwardly projecting and vertically extending central edge portion of the baffle, said baffle having inwardly turned outer edge portions curved throughout substantially 360 degrees and extending in the direction of said concave surfaces and in spaced relation thereto to form a narrow convergent throat through which liquid entrainment particles centrifugally deposited on said concave surfaces by the gas sweep toward said edge portions are displaced into vertically extending zones isolated within said turned portions from the gas stream, the minimum spacing of said turned portions and concave surfaces within said throats being restricted to gaps capable of passing liquid entrainment into said space but sufficiently narrow to prevent gas flow into and out of said zones through the throats at any appreciable velocity.

3. A separator comprising a vertically extending baffle having a gas-impinged surface of substantially semicircular curvature concavely in the direction of the gas flow, said baffle having an inwardly turned outer edge portion curved throughout substantially 360 degrees and extending in the direction of said concave surface and in spaced relation thereto to form a narrow convergent throat through which liquid entrainment particles centrifugally deposited on said concave surface by the gas sweep toward said edge portion are displaced into a vertically extending zone isolated within said turned portion from the gas stream, the minimum spacing of said turned portion and concave surface within said throat being restricted to a gap capable of passing deposited liquid entrainment into said zone but sufficiently narrow to prevent gas flow into and out of said zone through the throat at any appreciable velocity; the radius of curvature of said concave surface, the radius of curvature of said edge portion and the width of said gap having dimensional relationship in the ratio of about $1:\frac{1}{4}:\frac{1}{16}$ in the order named.

JULIAN A. CAMPBELL.

REFERENCES CITED

The following references are of record in the file of this patent:

UNITED STATES PATENTS

| Number | Name | Date |
|---|---|---|
| 1,896,656 | Anderson | Feb. 7, 1933 |
| 1,400,795 | Bradley | Dec. 20, 1921 |

FOREIGN PATENTS

| Number | Country | Date |
|---|---|---|
| 254,361 | Germany | Dec. 2, 1912 |
| 453,546 | France | Apr. 5, 1912 |
| 257,368 | Germany | Mar. 4, 1913 |